(12) United States Patent
Falcone et al.

(10) Patent No.: US 8,273,676 B2
(45) Date of Patent: Sep. 25, 2012

(54) PUFFED BENTONITE LITTER

(75) Inventors: Robert Falcone, Little Falls, NJ (US);
Steven T. Adamy, Lawrenceville, NJ (US); D. Mark Bracilovic, Princeton, NJ (US); Frederick Lawson, Somerset, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 389 days.

(21) Appl. No.: 12/596,194

(22) PCT Filed: Apr. 17, 2008

(86) PCT No.: PCT/US2008/060659
§ 371 (c)(1),
(2), (4) Date: Nov. 23, 2009

(87) PCT Pub. No.: WO2008/131120
PCT Pub. Date: Oct. 30, 2008

(65) Prior Publication Data
US 2010/0132619 A1    Jun. 3, 2010

Related U.S. Application Data

(60) Provisional application No. 60/912,614, filed on Apr. 18, 2007.

(51) Int. Cl.
  *B01J 20/12*  (2006.01)
  *A01K 29/00*  (2006.01)
(52) U.S. Cl. ............... 502/80; 502/81; 502/85; 502/86; 502/407; 502/414; 119/173
(58) Field of Classification Search .............. 502/80, 502/81, 85, 86, 407, 408, 414; 119/173
See application file for complete search history.

(56) References Cited

U.S. PATENT DOCUMENTS

| | | | | |
|---|---|---|---|---|
| 4,607,594 A | * | 8/1986 | Thacker | 119/172 |
| 4,824,810 A | * | 4/1989 | Lang et al. | 501/84 |
| 5,207,830 A | * | 5/1993 | Cowan et al. | 106/672 |
| 5,421,291 A | * | 6/1995 | Lawson et al. | 119/173 |
| 6,287,550 B1 | * | 9/2001 | Trinh et al. | 424/76.6 |

* cited by examiner

*Primary Examiner* — Elizabeth Wood
(74) *Attorney, Agent, or Firm* — Frankel & Associates, P.C.; Stephen B. Shear

(57) ABSTRACT

An animal litter such as a clay material is treated to reduce the bulk density thereof by contacting the clay material with an aqueous electrolyte solution and then heating at an elevated temperature. Substantial reductions in bulk density have been achieved without reducing the absorption capacity of the clay granule.

10 Claims, 1 Drawing Sheet

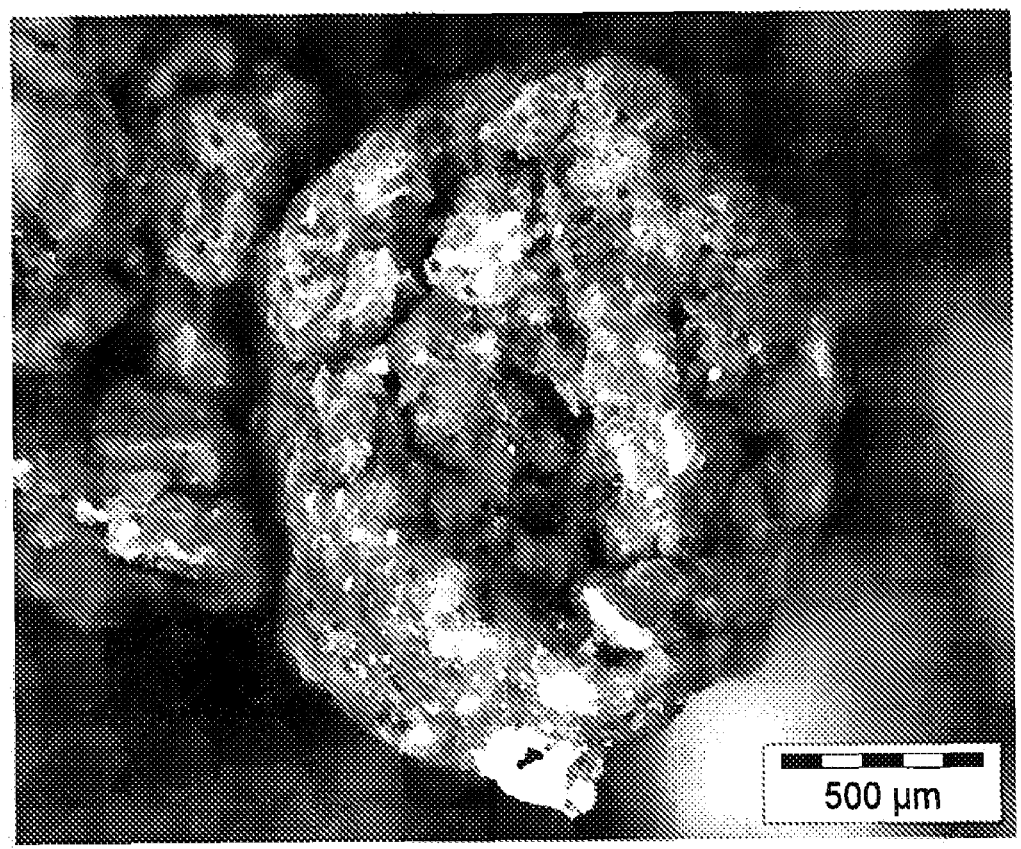

PUFFED BENTONITE LITTER

RELATED APPLICATIONS

This application is related to U.S. Provisional Application Ser. No. 60/912,614 filed on Apr. 18, 2007, and takes priority therefrom.

BACKGROUND OF THE INVENTION

As is well-known, many species of animals and birds are raised and/or kept by people for various purposes, e.g., as pets; for the production of valuable products such as food or furs; or for experimental purposes. A major problem connected with the raising and/or keeping of animals is the disposition of their waste excretions, mainly urine and feces. Whether the animal or bird is caged, in which case its waste is deposited on the floor of the cage, or allowed to roam free but is trained to deposit its waste in a particular receptacle, a "litter" material is generally employed which is capable of absorbing the liquid portion of waste excretions, primarily urine and the excess liquid of fecal matter.

The most commonly used litter box absorbent materials are inexpensive clays, such as calcined clays, that are safe and non-irritating to the animals, and that absorb relatively substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, cellulose, and water-insoluble inorganic salts, such as calcium sulfate. Each of these absorbent materials has the advantage of low cost, but each suffers from the disadvantage of merely absorbing a liquid waste product and holding the product within its porous matrices, or, in the case of sand, absorbing the liquid dross on its surface. For each absorbent material, offensive odors are eventually caused by the absorbed urine, and the entire contents of the litter box, including soiled absorbent material and unsoiled absorbent material, has to be discarded.

In order to reduce or eliminate objectionable odors, homeowners periodically remove the fecal matter from the litter absorbent physically. However, physical removal of the feces does not reduce or eliminate odors caused by the urine absorbed into the absorbent. Therefore, when the odors caused by the absorbed urine become intolerable, the homeowner discards the litter box absorbent material entirely. The homeowner then washes the litter box and refills the litter box with fresh litter box absorbent material. These activities are unpleasant, time-consuming and expensive. Consequently, the litter box absorbent material usually is a relatively inexpensive solid absorbent material, such that an individual cleaning of the litter box is not particularly economically burdensome. However, repeated litter box cleanings over a period of time accounts for relatively large expenditures.

Of particular interest as the basic component of animal litters are the clayey soils or comminuted rocks, e.g. the bentonites, comprising at least one water-swellable clay mineral, e.g., montmorillonite, since these materials have the ability to clump and harden after contact with an aqueous liquid such as urine. This facilitates the removal of only the soiled portion of the litter in a litter box or cage during cleaning without the necessity of removing all the litter.

Many clumping animal litters are made from clays and other mineral substrates. Such litters typically include particles of a mineral substrate, which substrate functions as an absorbent and/or odor reducer. The particles may be coated with a liquid-activated adhesive material, such as gelatinized starch, on the surfaces of the particles. When wetted, the adhesive material is activated and causes the discrete litter particles to agglomerate into clumps.

Although clay-based litters may be functional as clumping animal litters, such litters suffer from certain drawbacks. For example, one disadvantage of clay litters is the high density of the clay component of the litter. Because of this high density, a heavy mass of litter must be used for a given volume of urine. The resulting clumps of spent litter are somewhat heavy, and thus can fracture in the absence of strong interparticle adhesion. Another disadvantage of clay litters is that, because the clay is not biodegradable, the litter cannot be flushed into some sewerage systems after use. This may be inconvenient for certain animal owners.

Clumping litters made from bentonite were introduced in 1989, providing better and longer lasting odor control than did traditional litters. Bentonite is a swelling mineral of the clay category, with a unique ability to gel and agglomerate when wetted, creating scoopable clumps. However, mineral based clumping litter are heavy and dusty. While their innate absorption, clumping, and odor control attributes are good, further performance improvement by solid and/or liquid additives is limited.

SUMMARY OF THE INVENTION

A light density clay granule useful for a litter material is provided by treating the clay with an electrolyte solution and then heating at elevated temperatures sufficient to increase the porosity of the clay granule. Substantial reduction in the bulk density of the clay granules has been achieved.

BRIEF DESCRIPTION OF THE DRAWINGS

The FIGURE is a photograph of a sodium bentonite clay which has been treated by the process of this invention.

DETAILED DESCRIPTION OF THE INVENTION

The raw clay which can be treated in accordance with the process of this invention can include any clay useful to adsorb liquids and for use as a litter material. The raw clay can be from either the hormite mineral group (a hormite clay), the kaolinite mineral group (a kaolinite clay), or the smectite mineral group (a smectite clay). The hormite group of minerals includes the palygorskite and sepiolite varieties which have silicate ring, ribbon, or chain structures. The kaolinite group includes kaolin, halloysite, and dickite. The smectite mineral group includes the montmorillonite, vermiculite, nontronite, hectorite, and saponite varieties. Other minerals which are neither hormite, kaolinite, nor smectite which may be present in the raw clay are opal, apatite, calcite, feldspar, mica, quartz, and gypsum among others.

Preferred clay mineral may be, for example, a montmorillonoid or smectite, having a three-layer, sheet structure crystal lattice with two layers of silicon/oxygen tetrahedrons between which is a central layer of aluminum and/or magnesium/oxygen dioctahedrons or trioctahedrons. Part of the silicon in the tetrahedral layers may be substituted with aluminum and part of the aluminum and/or magnesium in the central octahedral layer may be substituted with other elements such as lithium, chromium, zinc, or iron. Contemplated montmorillonoid clay minerals are montmorillonite and nontronite containing a dioctahedral central layer, and hectorite, saponite, and sauconite containing a trioctohedral central layer.

When the foregoing montmorillonoid clay minerals are contacted with water or water vapor, the water molecules penetrate between the layers causing interlayer or intracrystalline swelling and expansion of the entire lattice. This causes the particles of clayey component in the animal litter to agglomerate thus facilitating the removal of only that portion of the litter which is swelled by urine or other aqueous waste liquid.

The clayey component may have a particle size in the range, for example, of about 300 to 2500 microns (about 50 to 8 U.S. mesh size), preferably about 420 to 840 microns (about 40 to 20 U.S. mesh size).

The preferred clayey component of the animal litter of the invention is a comminuted bentonite, more preferably a sodium bentonite, which contains a preponderant amount of montmorillonite clay mineral.

The metal salt that serves as the agent for reducing the bulk density of the clay method is supplied as in the form of an aqueous solution. Preferably, the metal salt is an alkali metal salt, alkaline earth metal or ammonium salt. The preferred alkali metal salt is selected from the group consisting of sodium carbonate, sodium bicarbonate, sodium chloride, lithium chloride, potassium carbonate, potassium chloride, sodium orthosilicate, and sodium metasilicate. More preferably, the alkali metal salt is sodium carbonate. The preferred alkaline earth metal salt is a member of the group consisting of calcium formate, calcium chloride, and magnesium chloride. Also, it is preferable that the metal salt is thermally decomposable.

In general, the metal salt or electrolyte is added to the clay material as an aqueous solution. When using an aqueous solution of the metal salt, the metal salt content of the solution is in the range of from about 5 to about 30% by weight of the salt and water. Typically, the metal salt content of the solution is from about 10 to 20% by weight. The clay granule is treated with the aqueous solution in general by soaking the clay granule in the aqueous solution. Other methods of treating the clay material with the aqueous solution can be utilized besides immersion. Thus, a spray process, drip process, or even a mixing process can be utilized. Typically the amount of aqueous solution of the metal salt is applied to the clay at a level in the range from about 40 to 1,000% by weight. The time the aqueous solution is in contact with the clay granules can be adjusted to ensure sufficient incorporation of the electrolyte into the pores of the clay granule. Thus, in a method in which the clay granules are immersed in the aqueous solution, a time for treatment can range from about 1 to 30 hours, with soaking times of between 10 and 25 hours being particularly useful.

The metal salt impregnated clay can be heated in a muffle furnace or in a rotary kiln to a temperature in the range from about 600° C. to 1,200° C. A particular useful temperature ranges from about 750-950° C. This temperature is maintained for a time period of from about 1 to 5 hours. A time period of from about 1 to 3 hours being particularly useful. What results is a clay particle which has a substantially reduced bulk density from the starting material. Thus, reductions in bulk density from at least about 10%, and typically, at least about 40% and higher have been achieved. Please see the FIGURE which shows the bentonite granule after being treated in accordance with this invention. Thus, the density of an untreated sodium bentonite will range from about 910-980 gm/liter, whereas the sodium bentonite treated in accordance with this invention will have a bulk density of less than about 750 gm/liter with bulk densities of from about 500-650 gm/liter being typical. Importantly, it has been found that the absorption of the puffed bentonite of this invention is increased, e.g. doubled, over the absorption of the untreated material.

EXAMPLE

Sodium bentonite was first treated in one of three different ways:
1) No treatment
2) Soaked with a water mist from a spray trigger, where particles were visibly darkened and all water was completely absorbed by the particles. The sample was allowed to sit in air for about 10 minutes
3) Soaked for 16 hours in a 10% (wt./wt.) aqueous solution of NH4Cl (50 g of bentonite soaked in 200 g of solution)

Approximately 2.3 g of each sample (with treatments 2 and 3 being wet) were placed in 50 mL ceramic crucibles. The samples were then placed in a muffle furnace at 850° C. for 2 hours. The samples were then removed and allowed to cool to room temperature for about 16 hours. The samples were exposed to ambient air during cooling.

Original (natural) density of Sodium Bentonite=0.9-1.0 grams/cm$^3$

Density of Samples 3=10% Aqueous Ammonia Chloride Solution Treated Bentonite=0.4 grams/cm$^3$ Density of Samples 2=Water Treated Bentonite=0.8 grams/cm$^3$.

Absorption for the untreated sodium bentonite=0.43 mg urine/gm of litter.

Absorption for the puffed bentonite=0.81 mg urine/gram of litter.

The invention claimed is:

1. A method of reducing the bulk density of clay granules comprising treating the clay granules with an aqueous solution of an electrolyte and then heating to an elevated temperature sufficient to reduce the bulk density of the clay granules.

2. The method of claim 1 wherein the clay is bentonite.

3. The method of claim 1 wherein the clay granules are treated with an aqueous electrolyte solution comprising from 40-1,000% by weight relative to the weight of the clay granules being treated.

4. The method of claim 1 wherein the aqueous solution contains 5-30% by weight of the electrolyte.

5. The method of claim 1 wherein the clay granules are soaked in the aqueous solution of the electrolyte.

6. The method of claim 1 wherein the clay granules after being treated with the aqueous electrolyte solution are heated to a temperature of from 600-1,200° C.

7. The method of claim 6 wherein the heat treatment is from 1-5 hours.

8. The method of claim 1 wherein the electrolyte is a bicarbonate salt.

9. The method of claim 1 wherein the electrolyte is a chloride salt.

10. The method of claim 1 wherein the electrolyte is an alkaline metal, alkaline earth metal or ammonium salt.

* * * * *